Aug. 29, 1939.  R. A. POWERS  2,171,433
SMOOTHNESS GAUGE
Filed Feb. 9, 1937  2 Sheets-Sheet 1
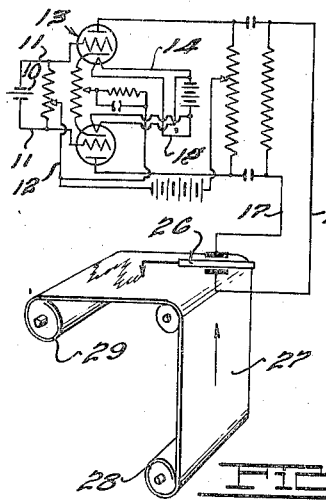
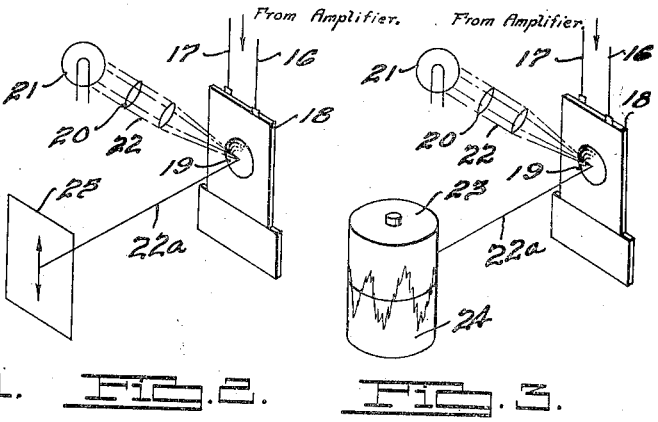
FIG. 1.  FIG. 2.  FIG. 3.
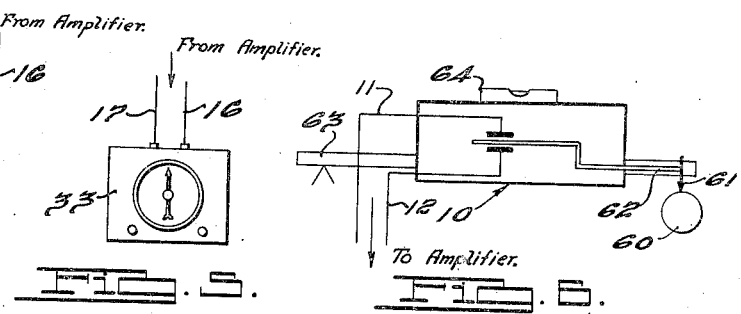
FIG. 4.  FIG. 5.  FIG. 6.
FIG. 7.
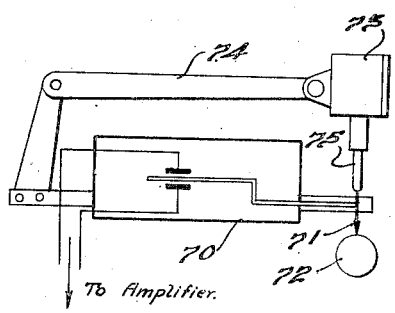
FIG. 8.
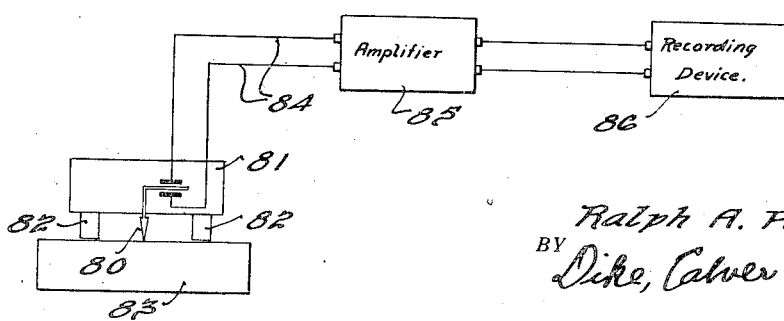
INVENTOR
Ralph A. Powers.
BY Dike, Calver and Gray
ATTORNEYS.

Aug. 29, 1939.    R. A. POWERS    2,171,433
SMOOTHNESS GAUGE
Filed Feb. 9, 1937    2 Sheets-Sheet 2
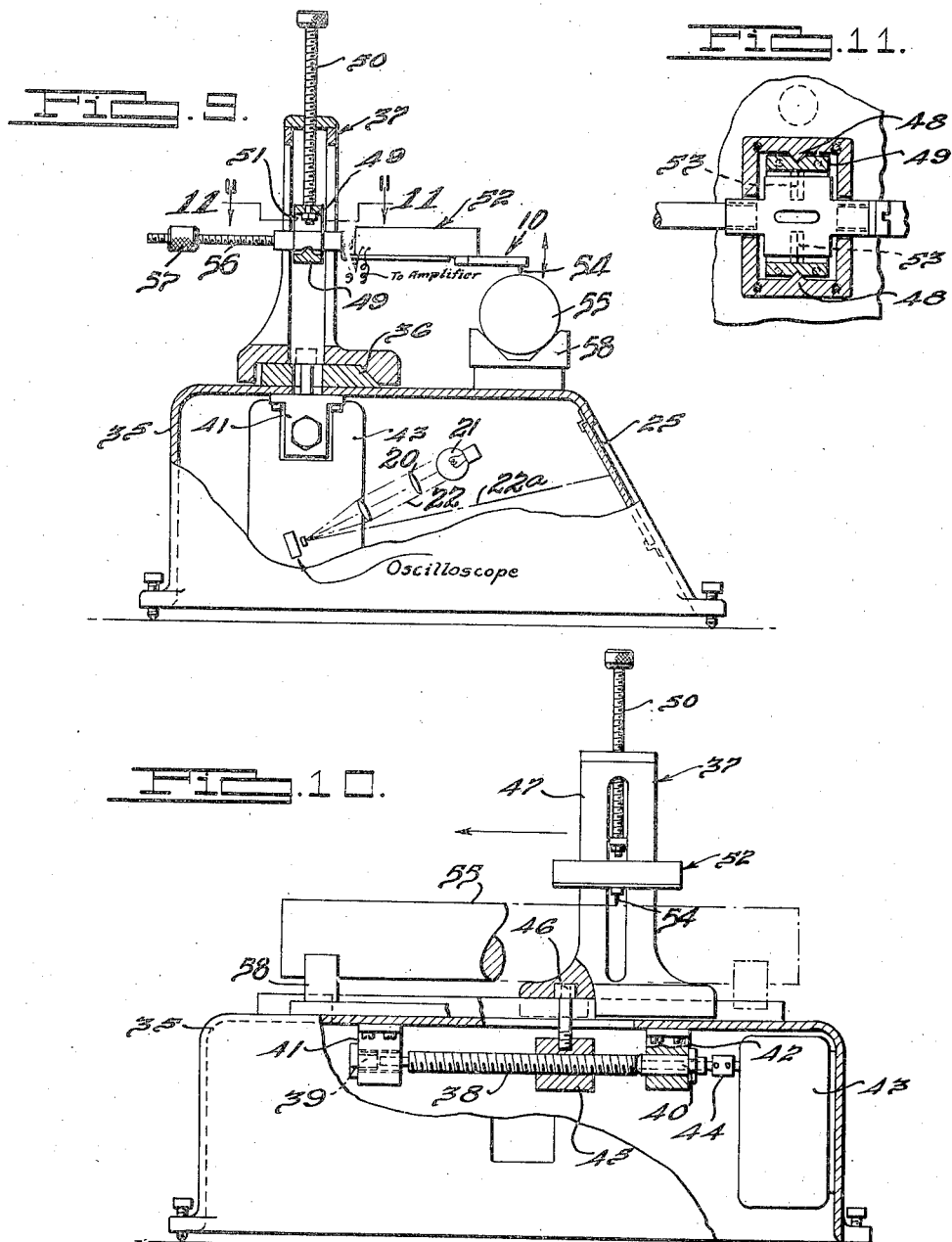
INVENTOR.
Ralph A. Powers
BY Dike, Calver & Gray
ATTORNEYS.

Patented Aug. 29, 1939

2,171,433

UNITED STATES PATENT OFFICE 2,171,433

SMOOTHNESS GAUGE

Ralph A. Powers, Grosse Pointe, Mich., assignor to Electronic Control Corporation, Detroit, Mich., a corporation of Michigan Application February 9, 1937, Serial No. 124,949

7 Claims. (Cl. 73—51)

This invention relates to improvements in the art of surface measurements and particularly to surface gauges or devices adapted to indicate the comparative roughness of finished surfaces and to measure accurately the surface irregularities present thereon.

One of the objects of the present invention is to provide an improved device of the foregoing character in which minute surface irregularities are translated into measurable variations in an electrical current, which variations may be translated into a physical image or recorded in any suitable manner.

Another object of the invention is to provide a surface gauge in which a surface contacting or exploratory element is maintained on the surface at a substantially uniform and regulated pressure, which pressure is substantially unaffected by changes in the relative positions of the said element relative to the surface under inspection.

Still another object of the invention is to provide a surface gauge or testing device in which suitable fixtures may be provided for readily receiving the object the surface of which is to be tested and maintaining the same in proper positions to make rapid inspections or tests of the surfaces of objects in large volume production.

A further object of the invention is to provide a surface gauge or surface inspection device which may be adjusted readily for use on surfaces of widely different smoothness characteristics without substantial changes in the equipment, and providing at the same time such a controlled degree of indication as may be desired for any particular type of surface to be inspected.

A still further object of the invention is to provide a surface gauge or inspection device which will give comparative measurements of the irregularities of the surface under inspection with reference to a selected reference surface established as a smoothness guide, said gauge or device giving a graphic record of irregularities of the surface under test or inspection.

A still further object of the invention is to provide a surface gauge or inspection device, the indications of which are substantially unaffected by slow changes of elevation of the tested surface, such for example as gradual inclines, and which permits ready measurement or inspection of such surfaces with a single setting of the object in the device.

It is an added object of the invention to provide an improved surface gauge or inspection device which is simple in construction and operation and does not require extremely delicate or complicated adjustments, the said device being of rugged construction and design, capable of withstanding ordinary shop usage without impairment of its accuracy.

It is a further object of the present invention to provide a device adapted for the inspection and measurement of minute surface irregularities on smooth surfaces through the medium of variations in the flow of an electric current induced and controlled by said irregularities.

It is another object of the invention to provide a device adapted for the inspection and measurement of minute surface irregularities on smooth surfaces in which said irregularities are utilized to actuate and control measurable variations in an electric current, and in which said variations are translated into impulses recognized through the physical senses.

A further object of the invention is to provide a device adapted for the inspection and measurement of minute surface irregularities on smooth surfaces in which irregularities of the surface within predetermined limits are translated into electrically actuated and controlled impulses recognizable by the physical senses.

A still further object of the invention is to provide a device adapted for the inspection and measurement of minute surface irregularities on smooth surfaces not readily recognizable by the physical senses and in which said irregularities are translated into impulses of a magnitude readily discernible by the physical senses.

Other objects of this invention will appear in the following description and appended claims, reference being had to the accompanying drawings forming a part of this specification wherein like reference characters designate corresponding parts in the several views.

Fig. 1 is a diagrammatic view of a device embodying the present invention in which a piezo electric pickup device is electrically connected with an amplifier, here shown, schematically as of the balanced or so-called "push-pull" type with which is electrically connected a piezo electric recording pen which records on a graph paper the variations of the surface under inspection or test.

Fig. 2 shows a modified form of the indicating portion of the device shown in Fig. 1 adapted to provide a visual inspection of the character and size of the surface irregularities.

Fig. 3 is a diagrammatic view of a device embodying the present invention as adapted for making a photographic record of variations in smoothness of the surface under inspection.

Fig. 4 shows an arrangement similar in part to that of Fig. 3, in which the recording is accomplished by a recording pen of electro-magnetic type.

Fig. 5 shows an arrangement in which the indications of surface irregularities are recorded by an electrically actuated visual indicator.

Figs. 6, 7 and 8 show modifications of the device shown in Fig. 9, with particular reference to the application of the contact point to the surface of the object under inspection or test, the object of such modifications being to secure substantially uniform pressures on the contact point and the surface of the test object.

Fig. 9 is a transverse sectional view of a surface gauge or testing device embodying the present invention in which is shown a test piece in place.

Fig. 10 is a longitudinal sectional view of the gauge or device shown in Fig. 9.

Fig. 11 is a sectional view of the upper assembly taken substantially on the line 11—11 of Fig. 9, in the direction of the arrows.

Fig. 12 shows a piece of recording paper having a typical surface curve drawn thereon indicating the variations in smoothness of a tested surface.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The gauge constructed in accordance with the present invention comprises generally a device adapted to cause variations in an electrical current in accordance with variations in the smoothness of a surface, an amplifier for such variations, and an indicating or recording device.

The device for causing variations in an electrical current may be controlled by a surface contacting element adapted to be drawn either manually or mechanically along the surface under inspection with a point following the irregularities thereof, or it may be controlled by other means, as for example a scanning beam of light falling on a photoelectric cell. In either instance the variations in smoothness of the surface under test is translated by such devices into variations in an electric current. I prefer to use the so-called piezo electric pick-up device in which variable frequency currents result from varying mechanical pressure on a piezo electric crystal. Such piezo electric pickup devices are particularly desirable for this use as the curve of the output circuit is substantially flat for from one cycle to 250 cycles per second. However, I do not desire to be limited to the pickup device of the piezo electric type, since it may be desirable in certain instances to use pickup devices of the electro-magnetic vibration type, or of the electrostatic vibration type, or of some other type producing a measurable variation in an electric current either at the same or other cycles of operation. Such devices may vary the output voltage, or the impedance or capacity of an electrical circuit in accordance with the vibrations transferred to the contacting point from the surface under inspection or test.

The function of the amplifying device is to amplify the variations in the electric currents produced by the device for varying the electric current. The amplification is carried to such a degree that the variations in said currents may be observed in the indicating devices or recorded by the recording devices. The amplifying device may be of any suitable type capable of effecting amplification to a degree sufficient to give the desired actuation to the indicating or recording devices employed. An amplifier of the conventional "push-pull" or balanced direct current type may be very conveniently used and is one preferred type of such device.

The indicating device is intended to translate the variation in electric currents amplified by the amplifying device into indications of a desired nature. The indicating device may be in the form of an electric meter with an indicating hand, or a suspended mirror type of galvanometer, or a piezo electric oscillograph. The amplified currents also may actuate sound producing devices or the like. If desired a written record may be made by using a recording device which may be either a piezo electric or electromagnetic recording pen or contact point. Depending upon particular requirements, my gauges may be constructed so as to include a visual indicating device only in which no written record is formed. If desired, a gauge embodying the present invention may be constructed in which both an indicating and a recording device may be used simultaneously or selectively.

In any of the foregoing types of recording devices, it will be seen that the current from the amplifying device is translated into impulses as of light, or sound, or of a mechanical nature such as written records, which impulses are thereby made readily perceptible to the physical senses.

In the drawings there is shown, by way of example, a device constructed in accordance with one embodiment of the present invention. Figs. 1 to 5 inclusive, show the device in a diagrammatic form. Referring to Fig. 1, the device may comprise a piezo electric pickup device 10 connected by means of the conductors 11 and 12 with an amplifier 13. As here shown, the device 10 is dependent upon mechanical contact with the surface under test. However, this may be eliminated if desired by substituting a scanning light beam or the like and using a photoelectric or similar cell for causing variations in an electric current in accordance with the changes in the reflected exciting light due to surface irregularities in the object being tested.

The numerals 14 and 15 indicate the input conductors of the amplifier while by the numerals 16 and 17 are indicated conductors connecting the amplifier with a piezo electric oscillograph 18. Said oscillograph includes an oscillating mirror 19 on which there is projected by means of an optical system 20 a beam of light from the source 21, said projected beam of light being indicated by the numeral 22. The reflected portion 22a of said light beam is projected on the rotatable drum 23 covered with photographic sensitized paper 24. Movements of the point of the pickup device 10 are translated into electric currents which are electrically amplified by the amplifier 13. The amplified currents are conducted to the oscillograph 18 and cause oscillation of the mirror 19. The reflected portion 22a of the light beam is, therefore, moving in accordance with the movements of said mirror 19, and if the drum 23 is rotated at a predetermined speed, an exposure will be made on the sensitized paper covering said drum 23.

If only a visual indication of the character of the surface under inspection is desired, said drum 23 may be removed and a ground glass screen 25 may be substituted therefor, as shown in Fig. 2. The amplitude of oscillation of the light spot produced on said screen 25 by the oscillating light beam 22a enables the observer to judge the character and the size of the surface irregularities over which the pickup device 10 is drawn. My device may be so constructed that a screen such as the screen 25 or a rotatable drum similar to the drum 23 may be used selectively.

Fig. 3 shows an arrangement for producing a direct record of the surface under inspection. In this case the amplifier 13 is connected to a piezo electric recording pen 26 adapted to move over the record paper 27, said paper being moved past said pen 26 from the supply roll 28 to the receiving or actuated roll 29. Fig. 4 shows a similar arrangement using a recording pen of the electro-magnetic type adapted to draw a curve on the paper strip drawn by the actuated roll 31 from the supply roll 32.

Fig. 5 indicates diagrammatically an arrangement in which indication of the character of the surface under inspection is effected by means of a galvanometer 33.

It should be noted that my improved gauge may be so constructed as to include a rotatable drum for making photographic records, a ground glass screen, and a recording device similar to those shown in Figs. 3 and 4, all of which may be used simultaneously as well as selectively.

Figs. 9 to 11 inclusive, show a particular embodiment of the present invention in a device adapted for regular production or laboratory use. Referring to said figures, the device comprises a casing 35, in this instance substantially in the form of an inverted rectangular box. On the upper surface of said casing 35 there are provided lapped ways 36 on which ways there is provided a contact point supporting assembly 37 adapted to move in said lapped ways 36.

Means for moving said contact point supporting assembly 37 on said ways 36 are exemplified in the present embodiment by a lead screw 38 rotatably supported between the centers 39 and 40 secured in the brackets 41 and 42 affixed to the casing 35 at the inside thereof. An electric motor 43 is resiliently mounted in said casing 35 and is connected to the lead screw 38 by means of a driving coupling 44. A nut block 45 secured to said assembly 37 by means of a screw 46 engages said lead screw and is adapted to move said assembly on said ways when the lead screw 38 is rotated by the motor 43. A suitable speed reduction mechanism is provided at said motor 43 for the purpose of imparting a desired rotative speed to said screw 38.

The contact point assembly 37 may comprise a support 47 provided with means adapting it to slide on the ways 36, and vertical lapped ways 48 engaging a slidable fulcrum block 49 supported by an adjusting screw 50. The slidable block 49 has an aperture 51 through which is passed a balanced articulated beam 52 supported on knife edges 53 provided on said block 49. One extremity of said beam 52 is adapted to carry the piezo electric pickup 10 which is here provided with a contact point 54 adapted to bear upon the surface of the test piece 55. The opposite extremity of said beam is threaded as indicated at 56, the threaded portion having a movable counterweight 57 by means of which the pressure with which the contact point 54 bears against the surface of the test piece 55 may be selectively varied.

The test piece 55 is held in operative position in a fixture 58 which is constructed to receive and to hold said piece in a proper operative position. By providing different special fixtures one gauge may be adapted for testing parts or objects of various kinds, such for instance as cam shafts, crank shafts, cylindrical bushings, and the like. By means of the adjusting screw 50, the elevation at which the beam 52 is supported may be changed selectively so as to maintain said beam in a substantially horizontal plane while measuring parts or objects of varying diameters which do not exceed the maximum extent of the adjustment. If desired, a spirit level may be placed on the arm carrying the pickup member and so insure a substantially uniform positioning of the arm relative to the test piece.

A ground glass screen 25 may be mounted in the front wall of the casing 35, where it serves to transmit visual indications of surface variations by movements of an oscillating mirror device of conventional design (not shown). A recording device may be conveniently mounted within the casing 35, if desired, said device being adapted to be used simultaneously with the oscillating mirror, or independently therefrom, as previously pointed out in connection with the diagrammatic views in Figs. 1 to 5 inclusive.

When a test piece, such as the piece 55, is operatively arranged in the fixture 58, the contact point 54 is next placed in contact with the surface to be tested, and the weight 57 is moved on the threaded portion 56 to produce a desired degree of pressure on the contact point 54. The motor 43 is then started and the lead screw 38 is rotated at a predetermined speed, moving the contact point assembly 37 in the lapped ways 36, whereby the contact point 54 is drawn along the surface of the test piece 55. Irregularities of the surface of said piece cause movements of the contact point, which movements are translated into a varying voltage. It should be appreciated that said surface irregularities are very small and in some extreme cases may be measured in terms of millionths of an inch. The variations in the current so produced are greatly amplified, and the amplified current conducted to the indicating or recording devices previously described. In the embodiment here shown, the contact point is drawn longitudinally over the surface of the test piece or object. However, it is to be clearly understood that I do not desire to be limited to the longitudinal movement of the contact point, since by providing suitable means for rotating the test piece, the surface of said piece may be tested peripherally. It is important to note that by the use of electrical indicating means my improved surface gauge and the reading given thereby are not affected by tapers, eccentricities, and other dimensional features of the articles tested, since the movements of the contact point produced by such features are too gradual to effect a variation in an electrical current and so will not be registered electrically in the arrangement here shown.

If a contact point or a similar device is used to explore or scan the surface, an important feature of my invention lies in the application of substantially uniform pressures of the contact point on the surface under inspection. Should it become necessary to check for smoothness the surface of an indentation, or any other surface lying below the surface for which the contact point is set, adjustments can be made so that lowering the point thereto will not substantially affect the pressure with which the point bears against the surface.

Because of the use of an adjustable counterweight arm, a constant and predetermined pressure is maintained on the contact point and on the work. This is very desirable in checking the variations in smoothness of irregular or curved surfaces. It is also possible with the use of said adjustable weight to adjust the pressure in such a way that, though a softer metal surface is being inspected, the contact point having an extremely short radius at its surface contacting end will not mar or scratch the surface of the metal.

Another important advantage of my improved gauge or inspection device is the possibility of adjustably varying the sensitivity of the device in any desirable degree by controlling the degree of amplification of the current generated by the contact point. As a result, my device can be used for checking the relative roughness of ordinary machine castings, and can be used immediately thereafter and without mechanical adjustments of the device, except possibly setting of the contact point, to check very smooth surfaces, such as the surfaces of "Johansson" blocks. No altering or changing of the equipment is necessary, and the control of the sensitivity of the device is effected by adjusting the amplifier to control the amount of amplification in the same manner as one adjusts the volume of a radio receiving set.

Another desirable feature is that by changing the degree of amplification and the speed of the driving motor, the record may be drawn or photographed in any desired scale or in any desired combination of scales.

For testing and calibrating the gauge or inspection device, I preferably employ an optical flat which has been corrected to about one-quarter wave length of mercury light, such flat being parallel on both plane surfaces to approximately eight millionths of an inch. When the contact point is caused to travel across such a flat, a base line may be generated on the recording paper and a substantially constant spot of light appears on the ground glass screen without noticeable variation therein. In this manner, a central or check graph line can be generated and used as a standard or reference line. If the recording is to be done by variations in a visible line of light, the guide or standard line may be marked on the viewing glass in any suitable manner. In Fig. 12 there is shown a piece of record paper on which the base line so drawn appears as the zero line, while the curve of irregular shape running vertically from said zero line represents the record of the surface inspected. The record paper is calibrated to show the degree of variation from the zero or reference line, as indicated in Fig. 12. To insure regular calibration of such paper, the record is made by the use of a diffraction grating having known cuts of depth. Such a grating may be checked with a spectrometer or spectrograph and the degree of variation in the cuts determined within very narrow limits. Any variation in uniformity of the grating can thus be compensated for within desired limits in the making of the paper record.

Various devices may be employed in carrying out the present invention to insure a uniform pressure on the surface of the test piece or piece undergoing inspection. One such device is shown in Figs. 9–11 inclusive, wherein an adjustably weighted arm is used for counterbalancing the beam carrying the surface contacting point. As shown in Fig. 6, the surface of the test piece 60 is contacted with the contact point 61 which is maintained on the piece by the arm 62. The arm is pivoted as at 63 and may be counterbalanced if desired. A spirit level or other indicating device 64 is secured to a portion of the arm 62 and is calibrated in such a manner that variations of the arm from a horizontal plane may be accurately determined. By providing an adjustment for the vertical height of the test piece 60 or by providing a counterweighted construction on the arm 62, as shown for example in Fig. 9, it is possible to so adjust the relation of the contact point 61 to the surface of the test piece 60 that a substantially uniform pressure is exerted thereon at all times when the spirit level or other indicating device 64 shows that the arm is lying in a substantially horizontal plane.

In Fig. 7 a modified construction for insuring uniform pressure of the contact point on the surface of the test piece is shown. Here a visual indicator is provided and the pressure of the contact point on the test piece may be regulated and controlled by the operator. Such a construction may comprise the piezo electric pickup 70, which has a point 71 contacting with the surface of the test piece 72. A dial type pressure indicator 73 is mounted on an arm 74 so that the spindle 75 of the indicator 73 is directly above the point 71. A pressure exerted by the point 71 in a downward direction upon the surface of the test piece 72 causes a vertical movement of the spindle 75, which movement is recorded on the dial indicator 73. Thus the point 71 may be pressed manually on the surface of the work piece at predetermined pressures which are recorded on the dial indicator. Such a construction permits a very rapid adjustment and gives a record of the pressures when the point is pressed upon the surface of the test piece. Such a construction is particularly desirable where the device of the present invention is being used to check the surfaces of items in quantity production and where a check or indication rather than an accurate recording of the surface irregularities is desired.

In the device as shown in Fig. 7 the positions of the test piece 72 and the contact point 71 may be adjusted vertically relative to each other in any desired manner to assure that a substantially uniform pressure be exerted by the point 71 on various test pieces with which the device is adapted for use.

In instances where the recording or inspection is desired in large quantity production or of large surfaces such as sheet stock or the like, the modification of the invention shown in Fig. 8 may be employed. As here shown, the contact point 80 of a piezo electric pickup 81 is mounted between a pair of shoes or guides 82. The point 80 is so arranged as to depend slightly below the lower surfaces of the shoes 82 and to contact with the surface of the test piece 83. Such a piezo electric pickup may be electrically connected by flexible electrical connections 84 with the amplifier 85, which in turn is electrically connected with any desired type of recording medium indicated generally at 86.

A device constructed in accordance with Fig. 8 is not as accurate a measuring device as the devices previously described, but assures that a substantially uniform pressure will be exerted upon the surface of the test piece by the contact point 80. This construction permits greater flexibility of the equipment than the constructions previously discussed as the piezo electric pickup may then be moved manually over the surface which is to be tested and it is not necessary to adjust the machine to such surface or the surface to the machine as is required in the other embodiments of the present invention. Also the surface may be moved relative to the contact point to produce the desired testing of the surface.

In the embodiments shown in Figs. 6, 7 and 8, it is to be understood that electrical connections are provided between the piezo electric pickup and the amplifying and recording devices in a manner similar to that previously disclosed in connection with the other embodiments of the present invention. Also, it is to be understood that pickup devices other than of the piezo electric type may be used with the present invention.

The piezo electric pickup is a particularly desirable type of contacting point to use in the various embodiments of the present invention, particularly where a piezo electric pen is used as the recording medium. Such devices have a substantially constant impedance if the temperatures to which they are subjected are substantially constant. The variations in frequency between the piezo electric pen and the piezo electric pickup are so slight that no appreciable error will occur in the records made of the surface. The amplifier is designed to operate on speeds slower than one cycle, figured at 60 cycles per second, and has a flat response or voltage output up to at least 1000 cycles. The piezo electric pickups or recording pens have a substantially constant output for frequencies from one cycle to 250 cycles per second. Since in all instances the surface to be tested is not traversed at such a speed that the vibrations due to surface irregularities transmitted to the contact point will exceed its cycle of operation, it will be seen that the record made will be substantially accurate. The output of such a pickup member is substantially constant and the variations in the electrical current set up by such movement are amplified through the amplifier without substantial error due to different responses of the pickup member and the amplifier.

In the usual operation of a device of the present invention the average frequencies are approximately 30 cycles per second. Accordingly, it will be seen that the pickup, the amplifier, and the recording pen all are acting well within their limits of operation so that error in the record due to changes in the input frequencies within the limits of the amplifier are substantially eliminated. It is to be understood, however, that if higher frequencies of operation are required due to particular conditions on the surface of the test piece, the pickup device and the input circuit of the amplifier can be changed so as to accommodate different required frequencies of operation. In such event, if the speed of operation exceeds approximately 250 cycles, it is desirable that some means other than the piezo recording pen be used for making the visual record.

The contact point as previously disclosed may be mounted in different types of mountings to insure the desired contact with the surface of the test piece. As shown in Figs. 6, 9, 10, and 11, a knife edge balance is used to balance the counterweighted arm carrying the pickup member. Other types of supports may be provided within the scope of the present invention, such, for example, as gimbals, ball-and-socket joints, jewel bearings, or the like. If desired, the counterweighted arm may be eliminated, as shown particularly in Figs. 7 and 8. Also, if desired, springs exerting a substantially constant pressure or hydraulic pressure devices exerting a substantially constant pressure, may be employed in connection with the contact point of the pickup to exert a constant pressure of the point on the surface of the article.

From the foregoing discussion it is apparent to those skilled in the art that the invention herein disclosed will give accurate indications of the surface characteristics of a large variety of sizes and shapes of test pieces. It is contemplated that the preferred embodiment of the present invention will utilize a moving pickup member moving over a stationary test piece. However, it is also within the contemplation of the present invention to provide for a stationary pickup member and means for moving the test piece relative thereto. In certain instances, as, for example, in checking the surface characteristics of a cylindrical article, it may be desirable to provide means for moving synchronously the pickup device and the test piece. A curved surface may thus be checked for smoothness throughout its extent. All such modifications or variations are deemed to be within the scope of the present invention.

It is preferable to mount the entire gauge on a thick block of rubber in order to prevent any vibrations to be transmitted to the contact point by operation of the device.

From the foregoing it will be seen that the present invention is adapted to provide an inspection of surfaces to determine irregularities thereof and to record such irregularities or variations from an established standard, the inspection and recording being effected in each instance by amplification of variations in an electrical current induced, caused and controlled by the irregularities in the surface under inspection. By the means here shown and the method herein disclosed, it is possible to make perceptible to the physical senses otherwise imperceptible variations in smooth surfaces.

I claim:

1. A surface gauge comprising a base, a fixture on said base adapted to receive and to hold the test piece, ways on said base, a support adapted to move on said ways, a movable balanced beam, an electrical pickup device including a contact point carried by said beam and adapted to be held against the surface of the test piece at a predetermined pressure, means for moving said contact point relative to said surface at a uniform predetermined speed whereby said contact point is moved in response to the irregularities of said surface and variations in an electric current are produced in response to said movements, an amplifying device electrically connected therewith and adapted to amplify the current so produced, a visual indicating device electrically connected with said amplifying device and adapted to respond to electric currents flowing therefrom, said indicating device including a ground glass screen mounted on said base and an oscillating mirror adapted to reflect a beam of light on said screen.

2. A surface gauge comprising a base, a fixture on said base adapted to receive and to hold the test piece, smooth ways on said base, a support adapted to move on said ways, a balanced beam carried by said support, an electrical pickup device including a contact point on said beam adapted to bear against the surface under inspection, an adjustable weight on said beam for holding said point against said surface with a constant pressure, said contact point being also adapted to be moved on said surface and move in response to irregularities in said surface to produce variations in an electric current in response to said movements, an amplifying device electrically connected therewith and adapted to amplify the current so produced, and an indicating device electrically connected with said amplifying device and responsive to variations in an electric current flowing from said amplifying device to provide visual images of said variations.

3. A surface gauge comprising a base, a fixture on said base for holding the test piece in position, ways on said base, a support movable on said ways, means for moving said support on said ways at a substantially uniform speed, a balanced beam carried by said support, an electrical pickup device including a contact point on said beam adapted to bear against the surface under inspection, an adjustable weight on said beam for holding said contact point against said surface with a substantially constant pressure, said contact point being also adapted to be moved on said surface and move in response to irregularities in said surface to produce variations in an electric current in response to said movements, an amplifying device electrically connected therewith and adapted to amplify the current so produced, an indicating device electrically connected with said amplifying device and responsive to variations in an electric current flowing from said amplifying device to provide visual images of said variations.

4. A surface gauge comprising a base, a fixture on said base for holding the test piece in position, ways on said base, a support movable on said ways, means for moving said support on said ways at a substantially uniform speed, a balanced beam carried by said support, an electrical pickup device including a contact point on said beam adapted to bear against the surface under inspection, an adjustable weight on said beam for holding said contact point against said surface with a substantially constant pressure, said contact point being also adapted to be moved on said surface and move in response to irregularities in said surface to produce variations in an electric current in response to said movements, an amplifying device electrically connected therewith and adapted to amplify the current so produced, an indicating device electrically connected with said amplifying device and adapted to respond thereto, said indicating device including a recording device actuated by the amplified current and adapted to form a continuous visual record.

5. A surface gauge comprising a base, a fixture on said base for holding the test piece in position, ways on said base, a support movable on said ways, means for moving said support on said ways at a substantially uniform speed, and comprising a lead screw rotatably supported on the base, a nut block secured to said support and engaging said screw, and an electric motor connected in driving relation to said screw, a balanced beam carried by said support, an electrical pickup device including a contact point on said beam adapted to bear against the surface under inspection, an adjustable weight on said beam for holding said contact point against said surface with a substantially constant pressure, said contact point being also adapted to be moved on said surface and move in response to irregularities in said surface to produce variations in an electric current in response to said movements, an amplifying device electrically connected therewith and adapted to amplify the current so produced, an indicating device electrically connected with said amplifying device and responsive to variations in the electric current flowing from said amplifier and adapted to translate said variations into visual images.

6. A surface gauge comprising a base, a fixture on said base for holding the test piece in position, ways on said base, a support movable on said ways, means for moving said support on said ways at a substantially uniform speed and comprising a lead screw rotatably supported on the base, a nut block secured to said support and engaging said screw, and an electric motor connected in driving relation to said screw, a balanced beam carried by said support, an electrical pickup device including a contact point on said beam adapted to bear against the surface under inspection, an adjustable weight on said beam for holding said contact point against said surface with a substantially constant pressure, said contact point being also adapted to be moved on said surface and move in response to irregularities in said surface to produce variations in an electric current in response to said movements, an amplifying device electrically connected therewith and adapted to amplify the current so produced, an indicating device electrically connected with said amplifying device and adapted to respond thereto, said indicating device including a recording device actuated by the amplified current and adapted to form a continuous visual record.

7. In a surface gauge having a surface contacting point, means for supporting said point on the surface at a predetermined and substantially uniform pressure and comprising a support, ways on said support, a member adjustably slidable in said ways, a knife edge on said member, a balanced beam on said knife edge, one end of said beam being adapted to carry the contacting point, and an adjustable weight on the other end of said beam for varying the pressure exerted by said point on the surface.

RALPH A. POWERS.